United States Patent
Fujiwara et al.

(10) Patent No.: US 9,995,242 B2
(45) Date of Patent: Jun. 12, 2018

(54) METHOD FOR MODIFYING SURFACE OF PISTON FOR INTERNAL COMBUSTION ENGINE, AND PISTON FOR INTERNAL COMBUSTION ENGINE

(71) Applicants: ART METAL MFG CO., LTD, Ueda-shi Nagano (JP); FUJI KIHAN CO., LTD, Nagoya-shi Aichi (JP)

(72) Inventors: Nobuyuki Fujiwara, Ueda (JP); Yoshio Miyasaka, Nagoya (JP)

(73) Assignees: Art Metal Mfg. Co., Ltd., Ueda-shi, Nagano (JP); Fuji Kihan Co., Ltd., Nagoya-shi, Aichi (JP)

( * ) Notice: Subject to any disclaimer, the term of this patent is extended or adjusted under 35 U.S.C. 154(b) by 506 days.

(21) Appl. No.: 14/431,055

(22) PCT Filed: Oct. 8, 2013

(86) PCT No.: PCT/JP2013/077340
§ 371 (c)(1),
(2) Date: Mar. 25, 2015

(87) PCT Pub. No.: WO2014/057935
PCT Pub. Date: Apr. 17, 2014

(65) Prior Publication Data
US 2015/0233320 A1    Aug. 20, 2015

(30) Foreign Application Priority Data
Oct. 9, 2012 (JP) .................................. 2012-224359

(51) Int. Cl.
B23P 15/10    (2006.01)
F02F 3/00    (2006.01)
(Continued)

(52) U.S. Cl.
CPC ................. *F02F 3/00* (2013.01); *B23P 15/10* (2013.01); *B24C 1/10* (2013.01); *F16J 1/01* (2013.01); *Y10T 29/4925* (2015.01)

(58) Field of Classification Search
CPC ....... F02F 3/00; B24C 1/10; F16J 1/01; B23P 15/10
See application file for complete search history.

(56) References Cited

U.S. PATENT DOCUMENTS

| 5,980,659 A | 11/1999 | Kawaura et al. |
| 2008/0022962 A1 | 1/2008 | Fujiwara et al. |

(Continued)

FOREIGN PATENT DOCUMENTS

| JP | 05086443 | 4/1993 |
| JP | 2002301663 | 10/2002 |

(Continued)

OTHER PUBLICATIONS

European Search Report to corresponding EP application, 13845632.2, dated Apr. 16, 2016, 11 pages.
(Continued)

*Primary Examiner* — Ryan J Walters
(74) *Attorney, Agent, or Firm* — Cooper Legal Group LLC; Ronald Kachmarik (57) ABSTRACT

There is provided a piston with a surface modified layer for an internal-combustion engine by a method using a particle to be ejected made of iron-based alloy having a diameter of 20 to 200 μm, a thermal conductivity of 30 W/m·k or less at 25° C., and a specific gravity of 7.5 g/cm³ or greater. The method includes: first treatment for ejecting the particle onto a surface of a piston made of aluminum-silicon alloy or aluminum-copper-based alloy in a space in which oxygen exists at arc height value of 0.07 to 0.13 mm (N), second treatment for ejecting the particle onto the surface of the
(Continued)

Surface-modified layer piston in a space in which oxygen exists at arc height of 0.13 to 0.22 mm (N), and heating treatment applying to the piston for 1.5 hours or longer at 170 to 190° C. in a space in which oxygen exists.

7 Claims, 10 Drawing Sheets

(51) Int. Cl.
  *F16J 1/01* (2006.01)
  *B24C 1/10* (2006.01)

(56) References Cited

U.S. PATENT DOCUMENTS

2010/0083827 A1  4/2010  Fujiwara et al.
2010/0275874 A1  11/2010 Fujiwara et al.

FOREIGN PATENT DOCUMENTS

JP  2008051091  3/2008
JP  2011052322  3/2011

OTHER PUBLICATIONS

International Search Report dated Dec. 10, 2013, 2 pages.
International Search Report to corresponding PCT application, PCT/JP2013/077340, dated Dec. 10, 2013, 2 pages.

Comparative Example 2

METHOD FOR MODIFYING SURFACE OF PISTON FOR INTERNAL COMBUSTION ENGINE, AND PISTON FOR INTERNAL COMBUSTION ENGINE

TECHNICAL FIELD

The present invention relates to a method for modifying a surface of a piston for an internal-combustion engine with which strength deterioration does not occur even with use at high temperature and a piston for an internal-combustion engine to which the method for modifying the surface is applied.

BACKGROUND ART

A piston for an internal-combustion engine (hereinafter, simply referred to as a "piston" in this Specification) performs a reciprocating motion repeatedly at a high speed under explosive pressure and high temperature conditions. Therefore, the piston is required to have a high strength while having low weight from a viewpoint of enhancing fuel consumption or the like.

In such a piston, an aluminum-silicon-based alloy such as AC8A is employed for reducing the weight thereof, and fine crystal grains in the internal-combustion engine piston is fine-grained by means of precipitation hardening treatment or the like for enhancing the strength thereof. However, in a gasoline engine, for example, a temperature of a piston sometimes increases to about 300° C., and when the piston whose strength is increased by means of the aforementioned precipitation hardening is used under high temperature conditions exceeding the temperature used in the precipitation hardening treatment (about 200° C. to 250° C.), the fine-grained crystals formed due to precipitation hardening are recrystallized thereby the crystal grains are coarsened, as a result, the strength of the piston considerably deteriorates.

Accordingly, there is a demand for a method of enhancing the high-temperature strength of an aluminum-silicon-based alloy that is used under high temperature conditions.

Although additive alloy components themselves are being reconsidered as a method of enhancing the high-temperature strength of such an aluminum-silicon-based alloy, for example, adding a large quantity of nickel copper or the like which is a component that enhances high-temperature strength will increase the weight of the piston due to an increase in the specific gravity of the aluminum-silicon-based alloy. Therefore, while it is possible to enhance the strength, it is impossible to satisfy the weight reduction requirement.

In addition, in the case of increasing the strength by reconsidering the composition of alloy components, it is difficult to form uniformly fine-grained alloy components during casting. As a result, there is a problem in that mechanical characteristics are not sufficiently improved and the quality is variable, and so on. Furthermore, enhancement of the material strength causes deterioration of casting and forging properties and workability on one hand, in particular, cutting workability is considerably deteriorated as the strength is increased, and thus, an inevitable problem that arises is the trade-off between strength enhancement and workability deterioration.

Accordingly, because the above-described increase in material strength causes deterioration in the production efficiency of the piston and an increase in the manufacturing costs, it is impossible to simply enhance the strength.

As above, when adjusting the amount of alloy material, because it is difficult to achieve both enhancement of high-temperature strength of the internal-combustion engine piston and weight reduction thereof without sacrificing production efficiency and workability, it has also been proposed to improve the mechanical characteristics by means of processing performed, ex post facto, on an aluminum alloy member manufactured through a casting and forging step (hereinafter, simply referred to as "aluminum alloy member) without modifying the processing performed in the casting and forging step.

As an example of such a method, a method for modifying a surface of an aluminum alloy member by applying shot peening treatment to the surface of the aluminum alloy member has been proposed. With the proposed the method for modifying the surface, by ejecting a mixture of shot materials and fine particles, shot peening is performed with fine particles included among the shot materials when a surface portion of the aluminum alloy member is bombarded with the shot materials, and thus, the above-described fine particles are dispersedly embedded in the surface portion of the aluminum alloy member (see Claim 1 of Patent Document 1). With this method, abrasion resistance and corrosion resistance are enhanced due to inherent properties possessed by the fine particles that are embedded by shot peening described above, and thus, the strength reliability of the aluminum alloy member is increased (see Paragraph[0017] of Patent Document 1).

In addition, in another proposed method, at a surface of a piston made of an aluminum-silicon-based alloy and obtained by casting and forging, particles to be ejected whose diameters are 20 μm to 400 μm and that contain a reinforcing element such as Fe, Mn, Zn, Ti, C, Si, Ni, Cr, W, Cu, Sn, Zr or the like which enhances the strength of the alloy by being diffused and penetrated in the alloy constituting the piston, are ejected toward and made to collide with the surface at an ejection velocity of 80 m/s or greater or at an ejection pressure of 0.3 MPa or greater; and, as a result of the collision with the particles to be ejected, oxides at surface defect portions generated in the surface of the piston due to the casting and forging are removed, the surface defects generated in the surface are repaired, the alloy elements in the alloy of the piston are fine-grained in the vicinity of the surface of the piston, the reinforcing element contained in the particles to be ejected is diffused and penetrated in the vicinity of the surface of the piston, and thus, a modified layer having a uniformly fine-grained metal structure which contains the alloy element and the reinforcing element contained in the particles to be ejected is formed at the surface of the piston (see Patent Document 2).

DOCUMENTS OF RELATED ART

Patent Documents

Patent Document 1: Japanese Unexamined Patent Application Publication No. H05-86443
Patent Document 2: Japanese Unexamined Patent Application Publication No. 2008-51091 Corresponding U.S. Pat. Nos. 7,767,033 and 8,231,741

DISCLOSURE OF THE INVENTION

Problem to be Solved by the Invention

When the methods for modifying the surface disclosed in Patent Documents 1 and 2 are employed to improve the mechanical strength of a piston, these surface modifications are applied to the piston after a casting and/or a forging step, thus casting and forging of the piston themselves can be performed by using a conventional method. As a result, the various problems described above caused by changes in alloy components are eliminated.

However, with the method disclosed in Patent Document 1, as described above, fine particles are dispersedly "embedded" in the surface portion of the aluminum alloy member, and the strength reliability of the aluminum alloy member is increased by enhancing abrasion resistance and corrosion resistance by means of inherent properties of the fine particles that are embedded in this manner, thus in order to perform such "embedding", shot peening is performed by mixing the fine particles to be embedded in shot materials having a greater diameter than these fine particles (see Paragraph[0040] in Patent Document 1).

Accordingly, when employing the method disclosed in Patent Document 1, the above-described fine particles are merely "embedded" in the surface portion of the aluminum alloy member and the fine particles do not form strong bonds with the aluminum alloy member, therefore, the fine particles tend to peel off or fall from the surface portion, and, once the fine particles peel off or fall, enhancement of the mechanical characteristics due to the inherent properties of the fine particles cannot be expected.

In addition, Patent Document 1 also discloses a method for diffusing the fine particles embedded in the surface of the aluminum alloy member into the surface of the aluminum alloy member. However, in order to diffuse the fine particles in this way, heating treatment or the like needs to additionally be applied to the aluminum alloy member after the fine particles are embedded (Claim 3, Paragraphs [0038] and [0039] and the like). Thus, the treatment time and costs increase due to the increased number of steps.

In addition, when the heat treatment as described above is performed, the size of the aluminum alloy member may be changed, or a strain may be generated in some cases, and thus, complicated treatment conditions of the heat treatment, such as temperature, treatment time must be strictly controlled.

Note that, since a minute surface defect such as a cold shut in the piston causes notch embrittlement or the like, repairing the surface defect is an important factor in enhancing strength. However, in the method disclosed in Patent Document 1, no mechanism for repairing such a surface defect is provided, and, in addition, embedding metal fine particles in the aluminum alloy member as described above is actually expected to be a cause of notch embrittlement.

In addition, although uniformly fine-graining the alloy elements contributes to improve the mechanical characteristics of the piston and achieve uniform quality, the invention disclosed in Patent Document 1 does not disclose nor suggest means for realizing this.

Therefore, when attempting to obtain uniformly fine-grained alloy elements, it is necessary to realize this in steps involved in the casting stage, or simultaneously with the heat treatment performed in order to diffuse the fine particles embedded in the surface of the aluminum alloy member into the surface of the aluminum alloy member, and thus, the number of steps is increased and temperature control or the like must be strictly performed during the heat treatment.

On the other hand, with the method disclosed in Patent Document 2, not only is it possible to directly inherit the advantage of the invention disclosed in Patent Document 1, namely that, it is possible to easily enhance the mechanical strength of the piston at a low cost without affecting the production efficiency such as casting and forging properties, workability by making particles to be ejected collide with a surface of a piston obtained by casting and forging, but it is also possible to form a surface-modified layer that is strong and integrated with the surface of the piston without having to perform separate heat treatment or the like, and in combination therewith, it is additionally possible to perform treatments to repair a minute surface defect such as a cold shut and treatments to form uniformly fine-grained alloy elements in the vicinity of the surface of the piston or the like.

However, even in the case in which a surface-modified layer is formed in an internal-combustion engine piston by using the method disclosed in Patent Document 2 described above, a certain degree of strength deterioration was observed when used under high temperature conditions, and it was impossible to completely maintain the strength achieved immediately after performing blasting.

Therefore, the present invention has been conceived in order to solve the problems of the related art described above, and an object thereof is to provide a method for modifying a surface of a piston for an internal-combustion engine and the piston for the internal-combustion engine having a modified surface obtained by applying the method, with which strength of the piston does not deteriorate even when used under high temperature conditions after performing a treatment for modifying the surface of the piston.

Means for Solving the Problems

In order to achieve the above objective, a method for modifying a surface of a piston for an internal-combustion engine according to the present invention using a shot made of an iron-based alloy as a particle to be ejected having a diameter of 20 μm to 200 μm, a thermal conductivity of 30 W/m·k or less at a temperature of 25° C., and a specific gravity of 7.5 g/cm$^3$ or greater comprises:

a first ejection treatment for ejecting the particle to be ejected onto a surface of a piston in a space in which oxygen exists under conditions such that an arc height value is set within a range from 0.07 mm (N) to 0.13 mm (N) (in the Example, 0.10 mm (N)), and the piston being made of an aluminum-silicon alloy or an aluminum-copper-based alloy such as A2618 and obtained by casting and forging;

a second ejection treatment for ejecting the particle to be ejected onto the surface of the piston to which the first ejection treatment has been applied, in a space in which oxygen exists under conditions such that an arc height value is set within a range from 0.13 mm (N) to 0.22 mm (N) (in the Example, 0.20 mm (N)); and a heating treatment for subsequently applying heat to the piston for 1.5 hours or longer at a temperature of 170° C. to 190° C. in a space in which oxygen exists.

In the above method for modifying the surface of the piston, it is preferable that the particle to be ejected is ejected so that a total coverage in the first and second ejection treatments is 200% to 500% (in the Example, 300%). In this case, the first ejection treatment may be performed so that the coverage falls within a range from 100% to 200% (in the Example, 100%), and the second ejection treatment may be performed so that the coverage falls within a range from 100% to 300% (in the Example, 200%).

Furthermore, in the above method for modifying the surface of the piston, the particle to be ejected may be made of high-speed steel or stainless steel.

Moreover, a piston for an internal-combustion engine according to the present invention comprises a surface-modified layer that contains a grain-boundary oxide constituted of a stable oxide of an aluminum-iron-based alloy at grain boundaries of fine-grained aluminum and/or aluminum-based alloy and the surface-modified layer is formed within a range from 3 μm to 30 μm in depth from an outermost surface at a surface-modified portion of a piston made of an aluminum-silicon alloy or an aluminum-copper-based alloy.

Effects of the Invention

With the method described above, by performing a surface reinforcing treatment that forms a surface-modified layer having a structure in which grain-boundary oxides obtained through oxidation of alloy of aluminum and an iron-based material contained in particles to be ejected is existed at grain boundaries of fine-grained aluminum and/or aluminum-based alloy within a region of about 3 μm to 30 μm from the outermost surface, with a piston after performing the surface reinforcing treatment, it was possible to obtain a piston whose surface hardness does not deteriorate even when used under a high temperature condition (for example, 350° C.). that exceeds a temperature at which precipitation hardening treatment is performed (for example, 200° C. to 250° C.).

Although the reason why hardness deterioration was prevented when used under such a high temperature condition is not necessarily clear, with the surface-modified layer formed by using the method described above, it is likely that the grain-boundary oxides that are stable oxides of the aluminum-iron-based alloy and exist at the grain boundaries of the fine-grained aluminum and/or aluminum-based alloy inhibit recrystallization of crystal grains of the aluminum and/or aluminum-based alloy when subjected to high temperature, thus preventing hardness deterioration due to coarsening of the crystal grains.

BRIEF DESCRIPTION OF THE DRAWINGS

FIG. 3 are graphs showing component analysis results (including oxygen concentration) for the Example, where

FIG. 7 are graphs showing component analysis results (including oxygen concentration) for Comparative Examples, where

BEST MODE FOR CARRYING OUT THE INVENTION

Next, an embodiment of the present invention will be described below.

Method for Surface Treatment

Object to be Treated (Piston for Internal-Combustion Engine)

A piston used as an object to be treated in the present invention is not particularly limited so long as it is for an internal-combustion engine, and it may be for a gasoline engine, for a diesel engine, or for any other engine.

The material of the piston used as an object to be treated is an aluminum-silicon-based alloy or a material constituted of, for example, an aluminum-copper alloy such as A2618 or the like, and the piston as the object to be treated is obtained by means of casting and forging.

With the aforementioned piston, although the entire surface thereof may be used as the object to be treated, it is not necessarily required to use the entire surface of the piston as the object to be treated, and it is possible to apply the treatment of the method according to the present invention to a part of the surface of the piston.

Note that, in the case in which the treatment using the method according to the present invention is applied to a part of the surface of the piston, it is preferable that the surface treatment of the method according to the present invention be applied to one of or a plurality of the following portions.

Portion where a defect such as a cold shut is generated on a surface during casting.

Portion where strength is required due to high stress.

Portion where weight reduction is required.

Surface where a casting surface is exposed in a manufactured product.

Portion where abrasion resistance and heat resistance are required.

Particles to be Ejected

Particles to be ejected are made of an iron-based alloy and have a diameter of 20 μm to 200 μm, a thermal conductivity of 30 W/(m·K) or less at a temperature of 25° C., and a specific gravity of 7.5 g/cm$^3$ or greater.

Here, as will be described later, in order to generate grain-boundary oxides constituted of oxides of an aluminum-iron-based alloy at fine grain boundaries of fine-grained aluminum and/or aluminum-based alloy in the vicinity of a surface of the piston, it is necessary to make the iron (Fe) component in the particles to be ejected diffuse and penetrate and also to generate heat required for oxidation, and thus, it is necessary to make the particles to be ejected collide with the surface of the piston with a high energy.

The diameter, the thermal conductivity, and the specific gravity of the aforementioned particles to be ejected are conditions required to obtain the aforementioned collision energy and heat generation. When the diameter of the particles to be ejected is less than 20 μm, it is impossible to obtain the required collision energy even if particles to be ejected that fall within the range of specific gravity described above are used. On the other hand, once the diameter of the particles to be ejected exceeds 200 μm, although the overall collision energy is increased, the energy is dispersed because the collision area is increased, accordingly, it is impossible to make the components of the particles to be ejected diffuse and penetrate into the surface of the piston, and, in addition, it is impossible to obtain a required temperature increase because localized heat generation does not occur.

In addition, by using particles to be ejected made of a material having a relatively low thermal conductivity, namely, a thermal conductivity of 30 W/(m·K) or less at a temperature of 25° C., heat generated at the time of collision is locally concentrated, thus allowing heat generation at a level required for the generation of grain-boundary oxides.

Examples of iron-based metals having the thermal conductivity and specific gravity described above include high-speed steel and stainless steel.

Conditions for Ejection

The particles to be ejected described above are ejected on the surface of the aforementioned piston used as an object to be treated in two steps, namely, a first ejection step in which an arc height value is set at 0.07 mm (N) to 0.13 mm (N), and a second ejection step in which an arc height value is set at 0.13 mm (N) to 0.22 mm (N).

The reason why the particles to be ejected are ejected in the two steps using different arc height values is that, because the state of the outermost surface of pistons is variable in pistons manufactured by casting and forging due to oxides, blow holes, creases or the like generated during manufacturing, it is possible to form a uniform surface-modified layer on a processed surface of the piston by achieving uniformity in an outermost surface portion of the piston in the first ejection step in which the arc height value is set relatively low and by subsequently making the particles to be ejected collide in the second ejection step in which the arc height value is increased.

With the ejection of the particles to be ejected performed as described above, it is preferable that the ejection be performed so as to achieve a total coverage (the percentage of the area of the surface of the piston covered by dents) of 200 to 500% between the two ejection steps, that is, the first ejection step and the second ejection step, and it is even more preferable that, as with the arc height values, the coverage in the first ejection step be set lower than the coverage in the second ejection step.

Ranges of suitable coverages in the respective steps are 100% to 200% for the coverage in the first ejection step and 100% to 300% for the coverage in the second ejection step.

As an apparatus to be used for ejecting the particles to be ejected as described above, various types of known blasting apparatuses or shot peening apparatuses can be used, and, as such an ejecting apparatus, a unit employing a direct pressure method, a suction method, or any other ejecting method may be used.

With the collision of the particles to be ejected on the surface of the piston, in order to generate the grain-boundary oxides through the oxidation of the aluminum-silicon-based alloy and the iron-based alloy as described above, the particles to be ejected are made to collide with the surface in a space in which oxygen exists, for example, like in air, and therefore, it is preferable that compressed air be used also as an acceleration fluid to be used for ejection.

Heat Treatment

After the two-step ejection of the particles to be ejected is completed as described above, the piston as the object to be treated is heated in the atmosphere for 1.5 hours or longer at a temperature of 170° C. to 190° C.

The heat generation caused by the collision of the particles to be ejected is localized because it occurs at positions where minute particles to be ejected are collided with the surface of the piston, and stable oxides are not produced because heat generation and cooling are rapidly repeated in a short period of time due to the collision of the particles to be ejected, which results in an incomplete oxidized form having an oxygen-deficit structure in which the amount of oxygen that bonds with stable oxides is low, and such the oxygen-deficit structure tends to become more prevalent especially from the surface to the inside (see paragraph in Patent Document 2).

Because of this, after completing the ejection of the particles to be ejected described above, heating is performed in the atmosphere to facilitate oxidation of the aluminum-iron-based alloy, thereby stable oxides are obtained.

Note that, coarse crystal grains are formed and product dimensions are changed when heating at a high temperature is performed before grain-boundary oxides in a stable oxidized state are formed. On the other hand, oxidation cannot be promoted when the temperature is too low or the heating time is too short, accordingly, the heat treatment is performed for 1.5 hours or longer at 170° C. to 190° C.

Functions

When the metal particles that are made of an iron-based alloy and that have a diameter of 20 μm to 200 μm, a thermal conductivity of 30 W/(m·K) or less at a temperature of 25° C., and a specific gravity of 7.5 g/cm$^3$ or greater were ejected in two steps so that the arc height value takes the aforementioned values, and when the heat treatment was subsequently performed for 1.5 hours or longer at 170° C. to 190° C. as described above, the surface-modified layer provided with the grain-boundary oxides constituted of oxides of the aluminum-iron-based alloy at the grain boundaries of the fine-grained aluminum and/or aluminum-based alloy was formed at the surface of the piston made of the aluminum-silicon-based alloy.

By performing surface modification by using the method according to the present invention in this way, with the piston made of the aluminum-silicon-based alloy after the surface modification treatment is applied thereto, excellent high-temperature properties were observed in that hardness deterioration did not occur even after heating for 100 hours at a temperature of 350° C. which exceeds the temperature at which the precipitation hardening treatment of the aluminum-silicon-based alloy is performed, namely, 200° C. to 250° C.

Although the reason why the surface hardness of the piston does not deteriorate even when placed under high temperature conditions as described above is not necessarily clear, with the surface-modified layer formed on the surface of the piston to which the surface modification treatment is applied by using the method according to the present invention, it is likely because the coarsening of the crystal grains in the surface-modified layer was prevented due to the presence of the aforementioned grain-boundary oxides at the grain boundaries of the aluminum and/or aluminum-based alloy, even when heating at a relatively high temperature, namely, 350° C., was applied.

Specifically, the metal oxides are in a stable state as compared with a non-oxidized metal, and an oxidized metal has an increased hardness and an increased melting point as compared with a non-oxidized metal.

Because of this, it is likely that, by forming the grain-boundary oxides constituted of the oxides of the aluminum-iron-based alloy which are stable substances at the grain boundaries of aluminum in which a microcrystalline structure has previously been formed, even if coarsening of aluminum crystal grains is facilitated by heating, such coarsening of crystal grains is prevented by the presence of the stable grain-boundary oxides, as a result of which the surface-modified layer retains the microcrystalline structure even after heating.

Consequently, with the piston to which the surface modification treatment is applied by using the method according to the present invention, hardness deterioration does not occur even when used under high temperature conditions.

EXAMPLES

Figure 2:
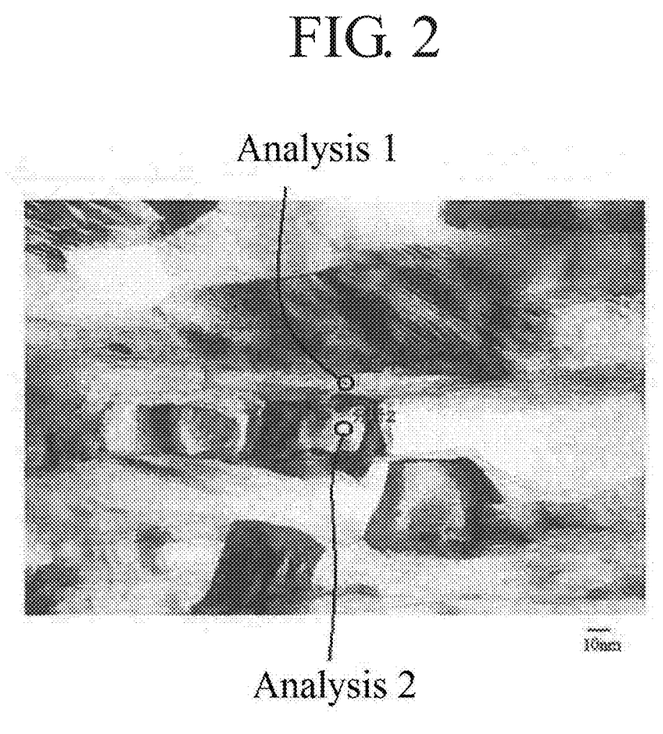
FIG. 2 is an electron microscope image showing a cross-section taken at a surface-modified-layer portion of the piston according to the Example.

Next, experimental examples related to the surface modification treatment using the method according to the present invention will be described below.
(1) Test for Confirming Conditions of Surface Modification With pistons for a gasoline-engine automobile, made of an aluminum-silicon-based alloy (AC8A) and to which the precipitation hardening treatment had been applied, surface treatment was applied to a skirt portion of the pistons under conditions shown in Table 1 below then the structures of the treated pistons in the vicinity of the surface thereof were also observed; and changes in the hardness of the surface of the piston after heating for 100 hours at a temperature of 350° C. in the atmosphere were also checked. Results are shown in Table 2.

tions described for the Example, and FIG. 2 shows an enlarged image of a surface-modified-layer portion thereof.

Figure 3A:
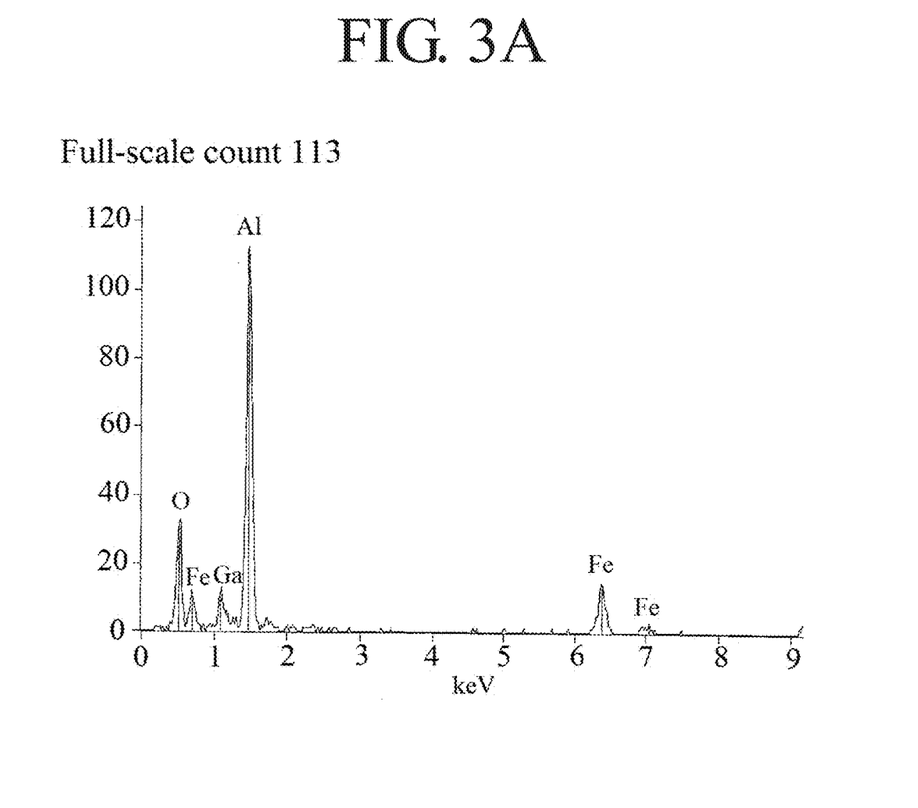
FIG. 3A shows analysis results for a portion of "Analysis 1" in FIG. 2
Figure 3B:
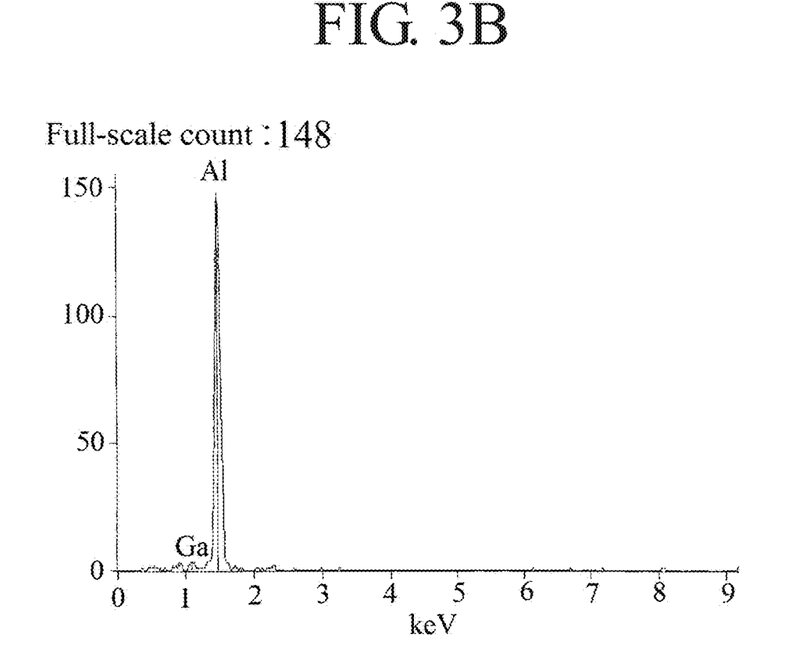
FIG. 3B shows analysis results for a portion of "Analysis 2" in FIG. 2.
Figure 4:
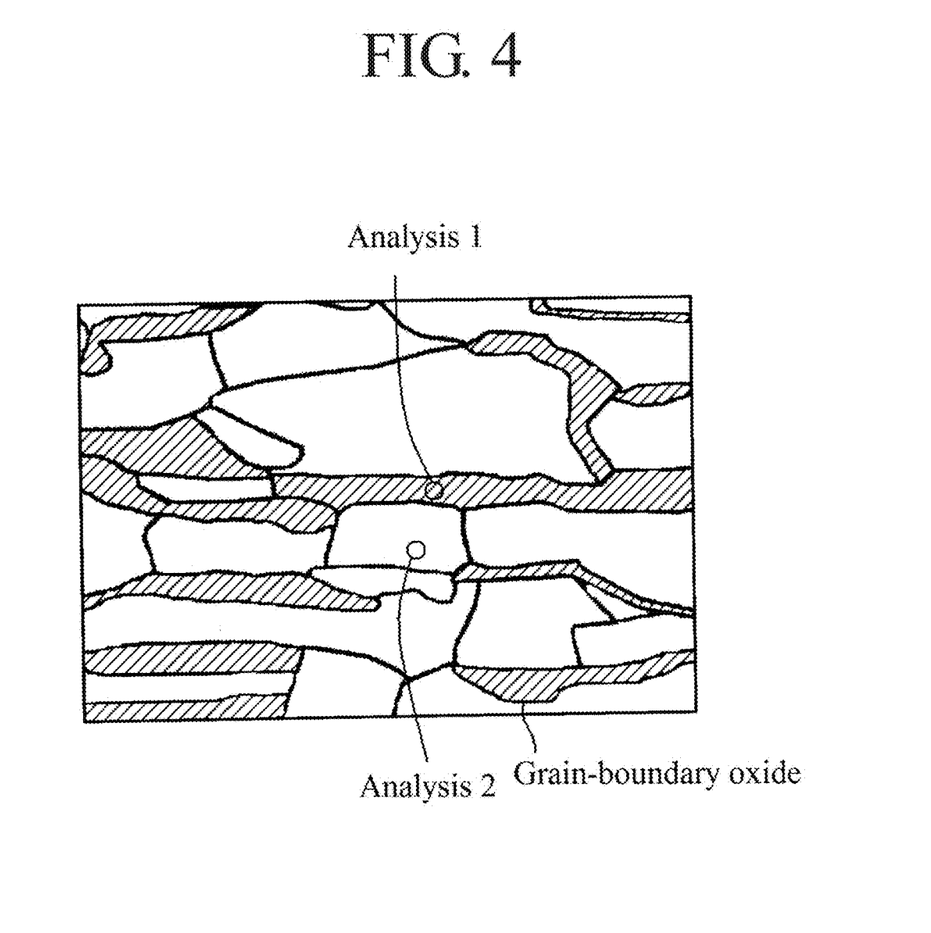
FIG. 4 is a schematic diagram showing a distribution of grain-boundary oxides in the electron microscope image in FIG. 2.

In addition, FIG. 3A and FIG. 3B respectively show component analysis results for portions indicated as "Analysis 1" and "Analysis 2" in the electron microscope image (enlarged image) shown in FIG. 2, and FIG. 4 shows a diagram schematically showing a distribution of the grain-boundary oxides in accordance with the component analysis results.

Figure 1:
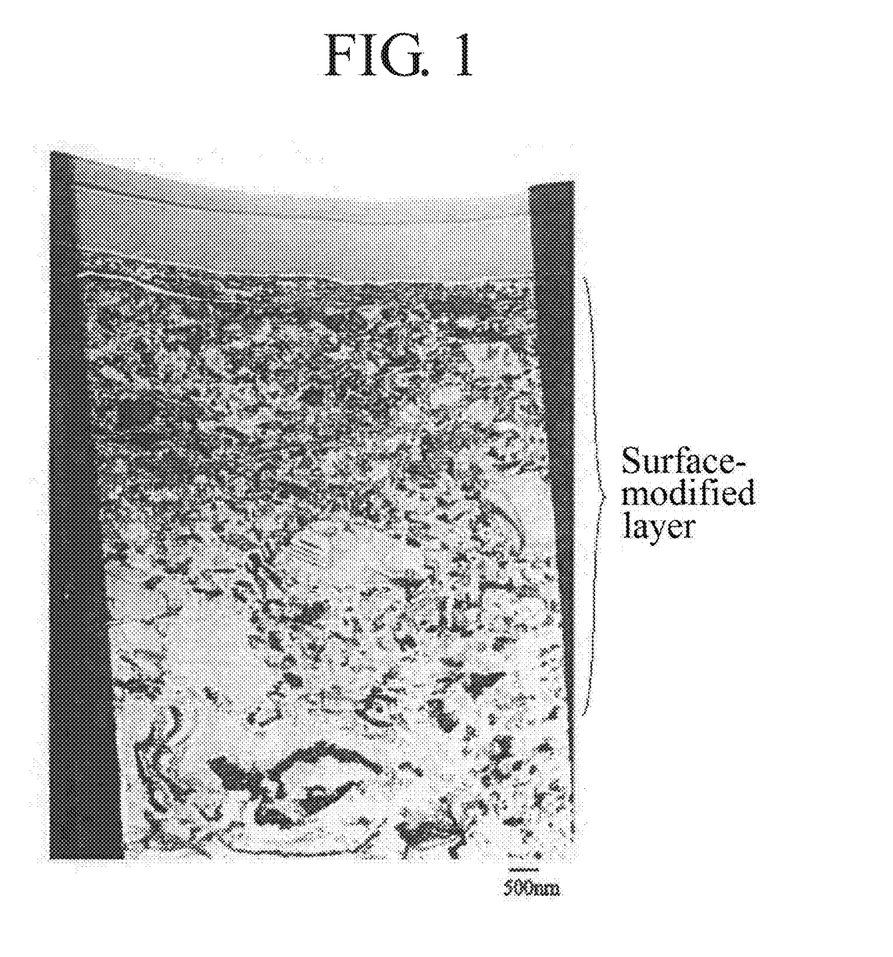
FIG. 1 is an electron microscope image showing a cross-section taken at a surface portion of a piston according to the Example.

As is clear from FIG. 1, with the piston to which the surface modification treatment was applied by using the method according to the present invention (Example), the formation of the surface-modified layer having fine crystal-line structure was confirmed in a region from the outermost surface to a depth of about 30 μm.

With regard to structures of individual portions in the surface-modified layer, the aluminum component was nearly the only component confirmed in the portion indicated as

TABLE 1

Treatment Conditions for Surface Modification

| | Treatment Conditions | | Example | Comparative Examples | | | | |
|---|---|---|---|---|---|---|---|---|
| | | | | 1 | 2 | 3 | 4 | 5 |
| Particle to be ejected | Material | | High-speed Steel | Cast Iron | Chrome Steel (10 Cr) | High-speed Steel | High-speed Steel | Un-treated |
| | Diameter (μm) | | 50 | 50 | 50 | 50 | 50 | |
| | Heat Conductivity [W/m · K (25° C.)] | | 23.8 | 48 | 31 | 23.8 | 23.8 | |
| | Specific Gravity (g/cm³) | | 8.07 | 7.28 | 7.79 | 8.07 | 8.07 | |
| Conditions for ejection | First Ejection | Arc Height [mm (N)] | 0.10 | 0.10 | 0.10 | 0.30 | 0.10 | |
| | | Coverage (%) | 100 | 100 | 100 | 300 | 100 | |
| | Second Ejection | Arc Height [mm (N)] | 0.20 | 0.20 | 0.20 | — | 0.20 | |
| | | Coverage (%) | 200 | 200 | 200 | — | 200 | |
| Conditions for heating | Heating Space | Atmosphere | Atmosphere | Atmosphere | Atmosphere | Atmosphere | Atmosphere | Not Performed |
| | Temperature (° C.) | | 180 | 180 | 180 | 180 | 180 | |
| | Heating Time (hr) | | 1.5 | 1.5 | 1.5 | 1.5 | 1.5 | |

TABLE 2

Confirmation of Surface-Modified Layer and Heating Test Results

| | Example | Comparative Example | | | | |
|---|---|---|---|---|---|---|
| | | 1 | 2 | 3 | 4 | 5 |
| Surface-Modified Layer | Grain-boundary oxides exist in grain boundaries | Presence of grain-boundary oxides was confirmed, but oxygen concentration was low in these portions (FIGS. 7A and 7B) | Grain-boundary oxides exist, but blow holes and creases remained and grain distribution was not uniform | Presence of grain-boundary oxides was confirmed, but oxygen concentration was low in this portion (FIG. 7C) | Untreated |
| Heating Test Results | Original hardness was retained | Considerable hardness deterioration was confirmed | Hardness deterioration was confirmed | No hardness deterioration | Stable performance was not achieved from initial stage | Considerable hardness deterioration was confirmed |
| Evaluation | Good | Poor | Acceptable | Acceptable | Acceptable | Poor |

Of the pistons to which the surface modification treatment was applied with the treatment conditions described above, FIG. 1 shows an electron microscope image of a cross-section taken at a surface portion of the piston to which the surface modification treatment was applied with the conditions described for the Example, and FIG. 2 shows an enlarged image of a surface-modified-layer portion thereof.

"Analysis 2" in FIG. 2. On the other hand, in addition to aluminum (Al), the presence of iron (Fe) and a relatively large amount of oxygen (O) was confirmed in the portion indicated as "Analysis 1" which exists between crystal grains in the portion in which the aluminum component was detected and other crystal grains, and it was confirmed that this portion was formed of oxides of an aluminum-iron-based alloy.

In FIG. 4, portions in which the oxides of aluminum-iron-based alloy exist are indicated by the hatching pattern in accordance with these component analysis results, and it is clear that these oxides (referred as "grain-boundary oxides" in the present invention) exist over a relatively large region in portions at which the grain boundaries of the aluminum and/or aluminum-based alloy occur in the surface-modified layer.

Figure 6:
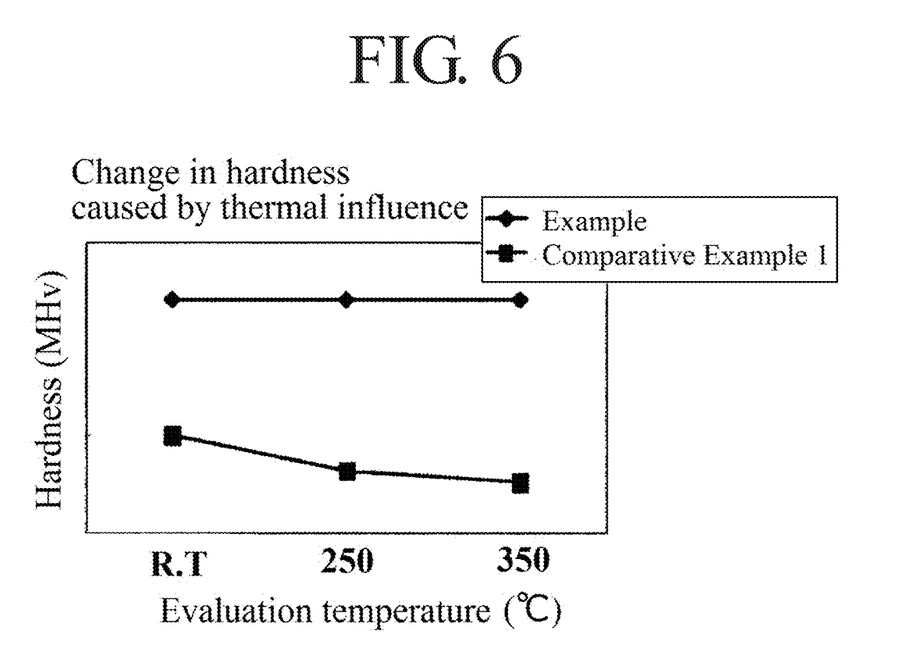
FIG. 6 is a graph showing changes in hardness of pistons according to the Example and Comparative Example 5 before and after heating (100 hours at 350° C.)

Thus, in the surface-modified layer having the structure in which the grain-boundary oxides which are the oxides of aluminum-iron-based alloy exist at the grain boundaries of the aluminum and/or aluminum-based alloy as described above, deterioration of the surface hardness was not observed even in the case in which heating treatment was performed for 100 hours at 350° C. after performing the surface modification treatment (FIG. 6).

In contrast, with the piston to which the precipitation hardening heat treatment was applied without additional treatment (Comparative Example 5), the piston hardness considerably deteriorated when subjected to heating for 100 hours at 350° C. (see FIG. 6).

Figure 7A:
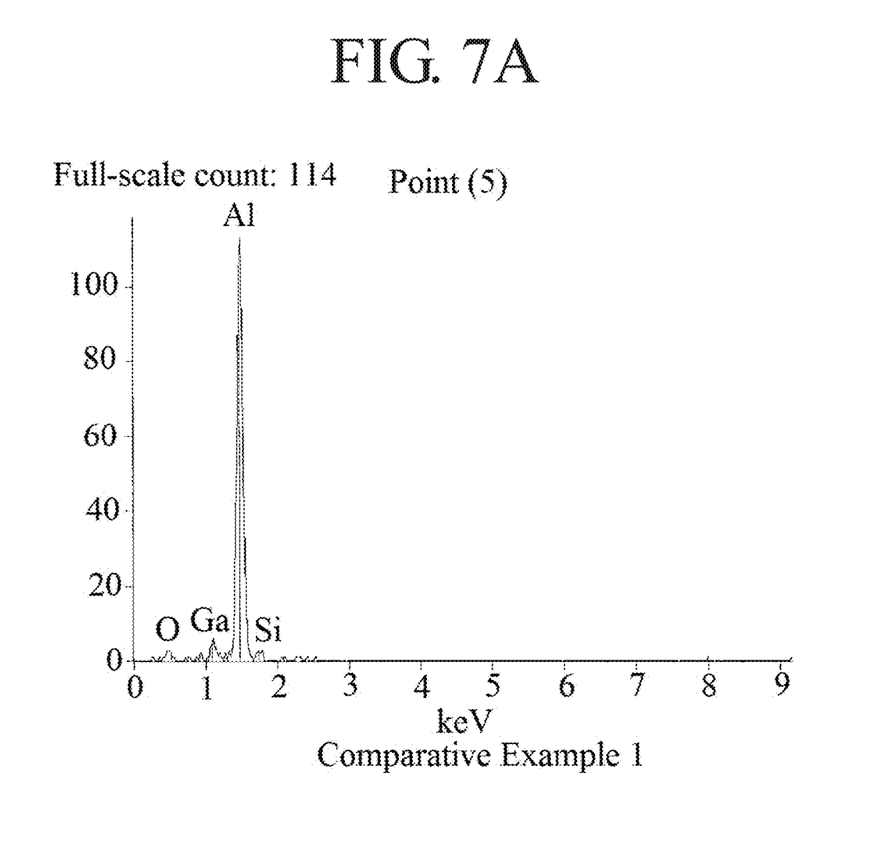
FIG. 7A shows analysis results for Comparative Example 1.
Figure 7B:
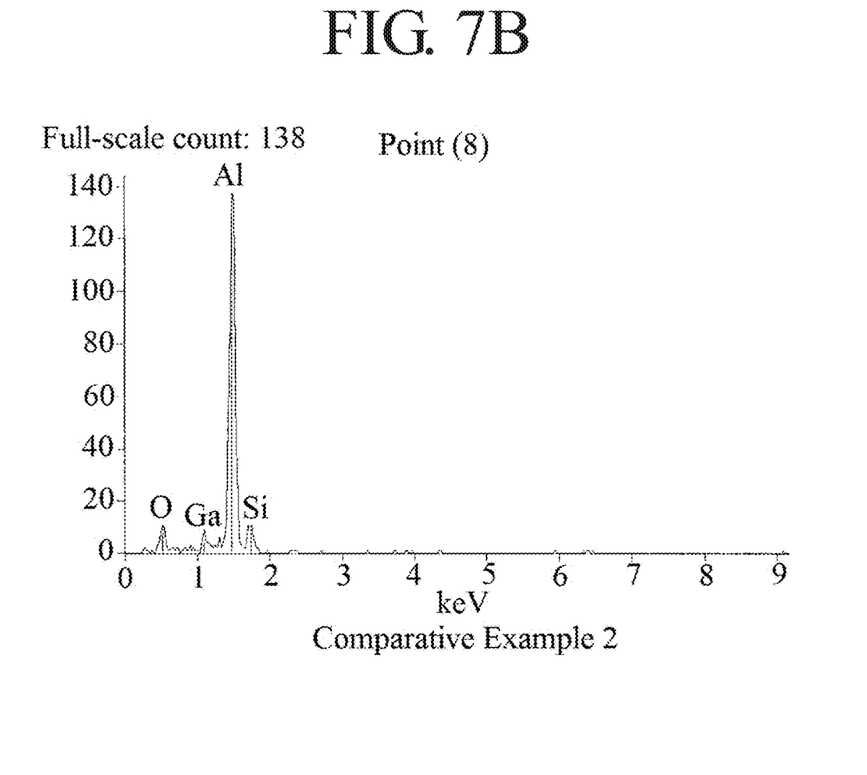
FIG. 7B shows analysis results for Comparative Example 2.

In addition, with Comparative Example 1 which used particles to be ejected having a thermal conductivity of 48 (W/m·K) which was greater than the range of the present invention, and a specific gravity of 7.28 (g/cm$^3$) which was lower than the range of the present invention, although it was possible to confirm the formation of the surface-modified layer and the presence of the grain-boundary oxides, the distribution of the grain-boundary oxides was smaller as compared with the case of the Example, and the oxygen concentration detected in the grain-boundary oxides was lower as compared with the case of the Example (FIG. 7A).

Furthermore, with Comparative Example 2 in which the thermal conductivity of the particles to be ejected was 31 W/m·K which slightly exceeded the predetermined range of the present invention, although the presence of the grain-boundary oxides in the surface-modified layer was confirmed, the oxygen concentration in the grain-boundary oxides was slightly lower as compared with the case of the Example (FIG. 7B), and slight deterioration of the surface hardness was confirmed after heating for 100 hours at 350° C.

Figure 7C:
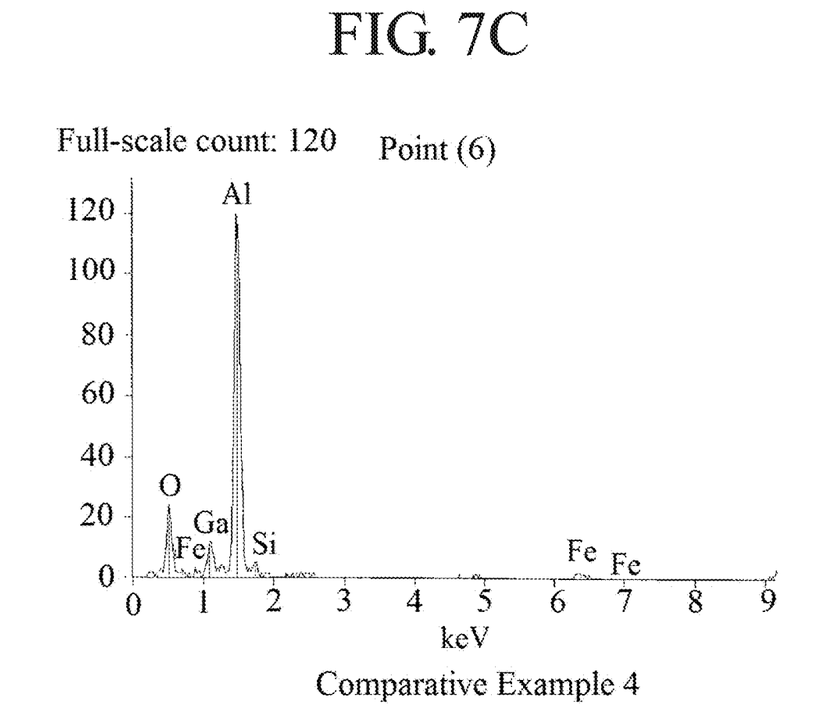
FIG. 7C shows analysis results for Comparative Example 4.

In addition, even in the case in which particles to be ejected satisfying the conditions of the present invention were used, with Comparative Example 4 in which the heat treatment after ejecting the particles to be ejected was omitted, although the presence of the grain-boundary oxides was confirmed, the oxygen concentration was lower as compared with Comparative Examples 1 and 2, and the performance at the initial stage of the experiment was slightly inferior (FIG. 7C). However, after heating for 100 hours at 350° C., the results were nearly identical to the case in which the heat treatment was not omitted.

The reason for performing the heat treatment is to prevent deterioration due to critical influences on the strength, abrasion resistance, or the like at the outermost surface, because satisfactory performance is not achieved at the initial stage of engine operation.

Note that, with Comparative Example 3 in which, although the particles to be ejected and heating conditions both satisfy the predetermined conditions of the present invention, the particles to be ejected are ejected in one step without dividing the process into two steps, the grain-boundary oxides were formed in the surface-modified layer, the oxygen concentration of the formed grain-boundary oxides was also equivalent to that of the Example, and, furthermore, clear hardness deterioration was not confirmed even after heating for 100 hours at 350° C.

However, in the piston to which the surface modification treatment was applied by using the method according to Comparative Example 3, blow holes and creases generated during casting and forging were not completely removed and remained at the surface even after the surface modification treatment, and thus, there is a risk of notch embrittlement originating from such blow holes and creases.

Figure 5:
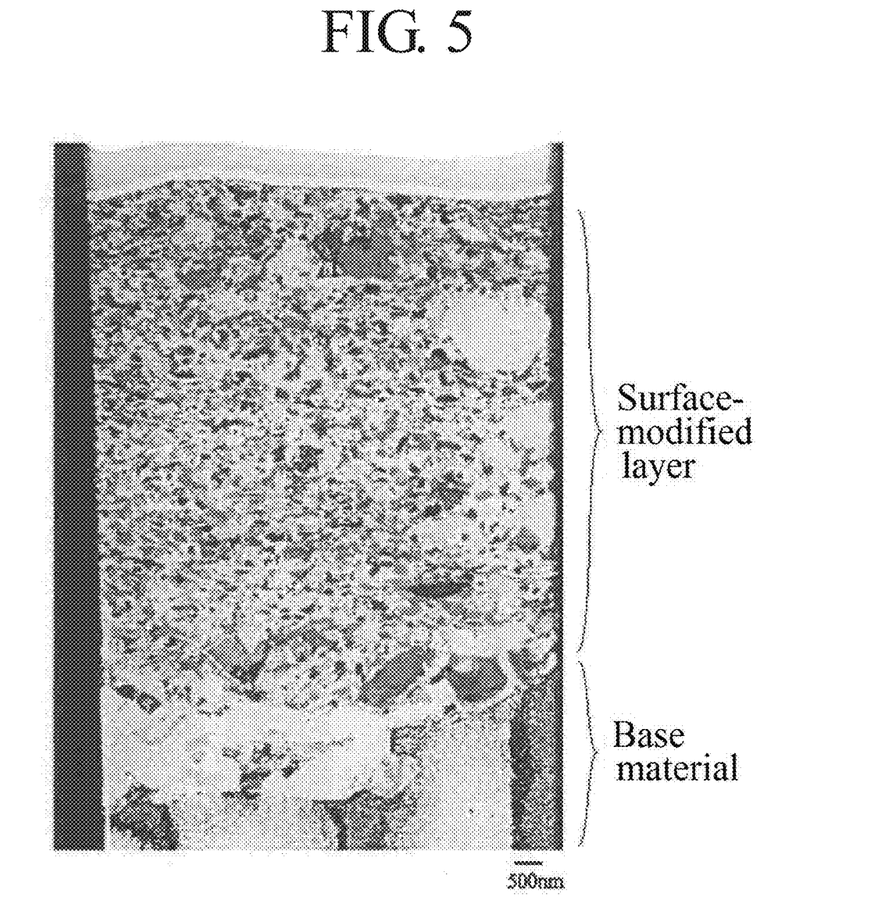
FIG. 5 is an electron microscope image showing a cross-section taken at the surface portion of the piston according to the Example after heating for 100 hours at 350° C.

Note that FIG. 5 is an electron microscope image showing a cross-section taken in the vicinity of the surface after the piston, to which the surface modification treatment was applied with conditions according to the Example, was heated for 100 hours at 350° C.

As is clear from FIG. 5, in the surface-modified layer formed in the region from the outermost surface to 30 μm (about 10 μm in FIG. 5), the microcrystalline structure was retained even after heating.

On the other hand, in portions below the surface-modified layer and closer to the base material, it is clear that crystal grains are coarser as compared with the piston before being heated for 100 hours at 350° C. (see FIG. 1), and it is clear that, with a structure in which only fine-graining was performed by means of the precipitation hardening heat treatment and the grain-boundary oxides are not generated at the grain boundaries, coarsening of crystal grains occurs when heated for 100 hours at 350° C.

From the above results, it can be concluded that the presence of the grain-boundary oxides that exist in the surface-modified layer prevents coarsening of the crystal grains in the piston placed under high temperature conditions and retains the microcrystalline structure, thus preventing hardness deterioration.

In addition, the oxygen concentration of these grain-boundary oxides is high, and therefore, it is understood that the capacity to prevent hardness deterioration after being exposed to high temperature conditions is increased with an increase in the stability of the oxidized state.

Thus, in obtaining the grain-boundary oxides in such a stable oxidation state, it was confirmed that it is effective to eject the particles to be ejected through two ejection steps by using particles to be ejected that fall within value ranges defined in the present invention and also to perform heating treatment for 1.5 hours or longer at 170° C. to 190° C. after ejecting the particles to be ejected.

The invention claimed is:

1. A method for modifying a surface of a piston for an internal-combustion engine by using a shot made of an iron-based alloy as a particle to be ejected having a diameter of 20 μm to 200 μm, a thermal conductivity of 30 W/m·k or less at a temperature of 25° C., and a specific gravity of 7.5 g/cm$^3$ or greater, comprising:

a first ejection treatment for ejecting the particle to be ejected onto a surface of a piston in a space in which oxygen exists under conditions such that an arc height value is set within a range from 0.07 mm (N) to 0.13 mm (N), and the piston being made of an aluminum-silicon alloy or an aluminum-copper-based alloy and obtained by casting and forging;

a second ejection treatment for ejecting the particle to be ejected onto the surface of the piston to which the first ejection treatment has been applied in a space in which oxygen exists and under conditions such that an arc height value is set within a range from 0.13 mm (N) to 0.22 mm (N); and a heating treatment subsequently applying to the piston for 1.5 hours or longer at a temperature of 170° C. to 190° C. in a space in which oxygen exists.

2. The method for modifying the surface of the piston for the internal-combustion engine according to claim 1, wherein the particle is ejected so that a total coverage in the first ejection treatment and the second ejection treatment is 200% to 500%.

3. The method for modifying the surface of the piston for the internal-combustion engine according to claim 2, wherein the particle to be ejected is formed of high-speed steel or stainless steel.

4. The method for modifying the surface of the piston for the internal-combustion engine according to claim 2, wherein the first ejection treatment is performed so that a coverage falls within a range from 100% to 200%, and the second ejection treatment is performed so that a coverage falls within a range from 100% to 300%.

5. The method for modifying the surface of the piston for the internal-combustion engine according to claim 4, wherein the particle to be ejected is formed of high-speed steel or stainless steel.

6. The method for modifying the surface of the piston for the internal-combustion engine according to claim 1, wherein the particle to be ejected is formed of high-speed steel or stainless steel.

7. A piston for an internal-combustion engine, wherein the surface of the piston has been modified by a method according to claim 1, the piston comprising:

a surface-modified layer that contains a grain-boundary oxide constituted of a stable oxide of an aluminum-iron-based alloy at grain boundaries of fine-grained aluminum and/or aluminum-based alloy and the surface-modified layer being formed within a range from 3 μm to 30 μm in depth from an outermost surface at a surface-modified portion of a piston for an internal-combustion engine made of an aluminum-silicon alloy or an aluminum-copper-based alloy.

\* \* \* \* \*